(12) United States Patent
Nishide et al.

(10) Patent No.: US 7,839,533 B2
(45) Date of Patent: Nov. 23, 2010

(54) IMAGE PROCESSING DEVICE

(75) Inventors: Yasushi Nishide, Ebina (JP); Ryuichi Ishizuka, Ebina (JP); Mari Kodama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1239 days.

(21) Appl. No.: 11/037,213

(22) Filed: Jan. 19, 2005

(65) Prior Publication Data

US 2005/0162698 A1 Jul. 28, 2005

(30) Foreign Application Priority Data

Jan. 23, 2004 (JP) ............................. 2004-15551

(51) Int. Cl.
*G06F 17/00* (2006.01)
(52) U.S. Cl. .................. 358/1.18; 714/244; 714/246; 714/253
(58) Field of Classification Search ............... 358/3.28, 358/1.18, 1.15, 1.14, 400, 401, 448, 1.9, 358/518, 520, 525; 356/400, 401
See application file for complete search history.

(56) References Cited

U.S. PATENT DOCUMENTS

| | | | |
|---|---|---|---|
| 5,001,769 A * | 3/1991 | Reid-Green et al. ......... 382/283 |
| 6,414,755 B1 * | 7/2002 | Bronstein et al. .......... 358/1.15 |
| 6,418,281 B1 * | 7/2002 | Ohki ........................... 399/49 |
| 2002/0036664 A1 * | 3/2002 | Arima et al. .................... 347/5 |
| 2002/0196455 A1 * | 12/2002 | Ishizuka et al. .............. 358/1.9 |
| 2002/0196464 A1 * | 12/2002 | Kodama et al. ............ 358/1.15 |
| 2003/0023486 A1 * | 1/2003 | Pavelka ........................ 705/14 |
| 2003/0142369 A1 * | 7/2003 | Hori et al. ................... 358/474 |
| 2003/0163786 A1 * | 8/2003 | Shields ........................ 715/517 |
| 2003/0180703 A1 * | 9/2003 | Yates et al. ................. 434/353 |
| 2003/0231325 A1 * | 12/2003 | Kubo .......................... 358/1.9 |
| 2004/0223181 A1 * | 11/2004 | Narusawa .................. 358/1.15 |

FOREIGN PATENT DOCUMENTS

| JP | A-11-216935 | | 8/1999 |
|---|---|---|---|
| JP | A-2001-251503 | | 9/2001 |
| JP | 2002142096 | * | 5/2002 |
| JP | A 2002-142096 | | 5/2002 |

* cited by examiner

*Primary Examiner*—Edward L Coles
*Assistant Examiner*—Haris Sabah
(74) *Attorney, Agent, or Firm*—Oliff & Berridge, PLC

(57) ABSTRACT

There is provided an image processing device carrying out image processing on one of image data and an image-drawing command inputted from an image processing terminal. The image processing device has: an extracting section that extracts finished dimension information according to the one of the image data and the image-drawing command; and an image-drawing section that draws a finish line on a page layout which corresponds to the one of the image data and the image-drawing command, on the basis of the finished dimension information extracted by the extracting section.

27 Claims, 4 Drawing Sheets

IMAGE PROCESSING DEVICE

CROSS-REFERENCE TO RELATED APPLICATION

This application claims priority under 35 USC 119 from Japanese patent application, No. 2004-015551, the disclosure of which is incorporated by reference herein.

BACKGROUND OF THE INVENTION

1. Field of the Invention

The present invention relates to an image processing device carrying out image processing on the basis of image data or an image-drawing command inputted from an image processing terminal such as a client computer or the like.

2. Description of the Related Art

In DTP (desktop publishing), a page layout is prepared by carrying out image creation, manipulation, editing, and the like at a processing device such as a personal computer, a workstation, or the like. On the basis of this page layout, a film is prepared in order to expose a printing plate (CEPS), or an image is directly written to a printing plate so as to prepare a printing plate for printing (CTP: Computer to Plate).

In DTP, when proofing or the like is carried out before creation of the actual printing plate or before printing by using the printing plate, there are cases in which the page layout displayed on a monitor is printed-out by using a color printing device such as a laser printer or the like by using a WYSIWYG function or the like.

In a DTP application, there are cases in which information regarding the image on the page layout, such as registration marks or captions or the like, is added automatically. In this way, when printing-out the image based on the page layout by using a laser printer or the like, the registration marks or captions are formed at predetermined positions. Further, when printing by using a printing plate which has been prepared on the basis of this page layout, cutting is carried out on the basis of the registration marks and captions.

When preparing a page layout or the like by using a DTP application, there are cases in which attempts are made to place the image or the like over the full range of (i.e., so as to fill) the finished size. At such times, if there is a gap between the actual finished size and the image position, blank gaps may be formed between the image and the edges of the sheet at the time of cutting.

As a way of preventing this problem, usually, so-called bleeding processing is carried out, and the page layout is prepared such that image drawing is carried out at a size which is about 3 mm larger than the finished size.

On the other hand, when a prepared page layout is outputted as a color comprehensive layout or outputted as a proof, it must be confirmed whether the bleeding has been carried out appropriately. To this end, image framing lines must be written in by hand.

It is known to provide a method in which the size and the positions of the finish lines are set in advance, and, at the time of printing-out, the finish lines also are image-drawn.

However, the size and the positions of the finish lines differ not only in accordance with the sheet size, but also in accordance with the DTP application. Therefore, when preparing a page layout, the size and the positions of the finish lines must be investigated and set in advance.

SUMMARY OF THE INVENTION

A first aspect of the present invention is an image processing device carrying out image processing on image data or an image-drawing command inputted from an image processing terminal, the image processing device including: an extracting section that extracts finished dimension information according to the image data or the image-drawing command; and an image-drawing section that draws a finish line on a page layout which corresponds to the image data or the image-drawing command, on the basis of the finished dimension information extracted by the extracting section.

A second aspect of the present invention is an image processing device carrying out image processing on image data or an image-drawing command inputted from an image processing terminal, the image processing device including: an extracting section that extracts finished dimension information according to the image data or the image-drawing command; a determining section that determines, from the finished dimension information extracted by the extracting section and positional information of an object on a page layout which is based on the image data or the image-drawing command, an object requiring bleeding which fills in a region between the object and a finish line obtained from the finished dimension information; and a notifying section that provides notice of results of determination of the determining section.

A third aspect of the present invention is an image processing device carrying out image processing on image data or an image-drawing command inputted from an image processing terminal, the image processing device including: an extracting section that extracts finished dimension information included in the image data or the image-drawing command; an object extracting section that extracts, from the finished dimension information extracted by the extracting section and positional information of an object on a page layout which is based on the image data or the image-drawing command, an object for which bleeding is to be carried out, the bleeding filling-in a region between the object and a finish line obtained from the finished dimension information; and a bleeding drawing section that carries out bleeding or object enlargement such that an edge of the object extracted by the object extracting section reaches a predetermined position crossing-over the finish line.

BRIEF DESCRIPTION OF THE DRAWINGS

An embodiment of the present invention will be described in detail based on the following figures, wherein.

DETAILED DESCRIPTION OF THE INVENTION

Figure 1:
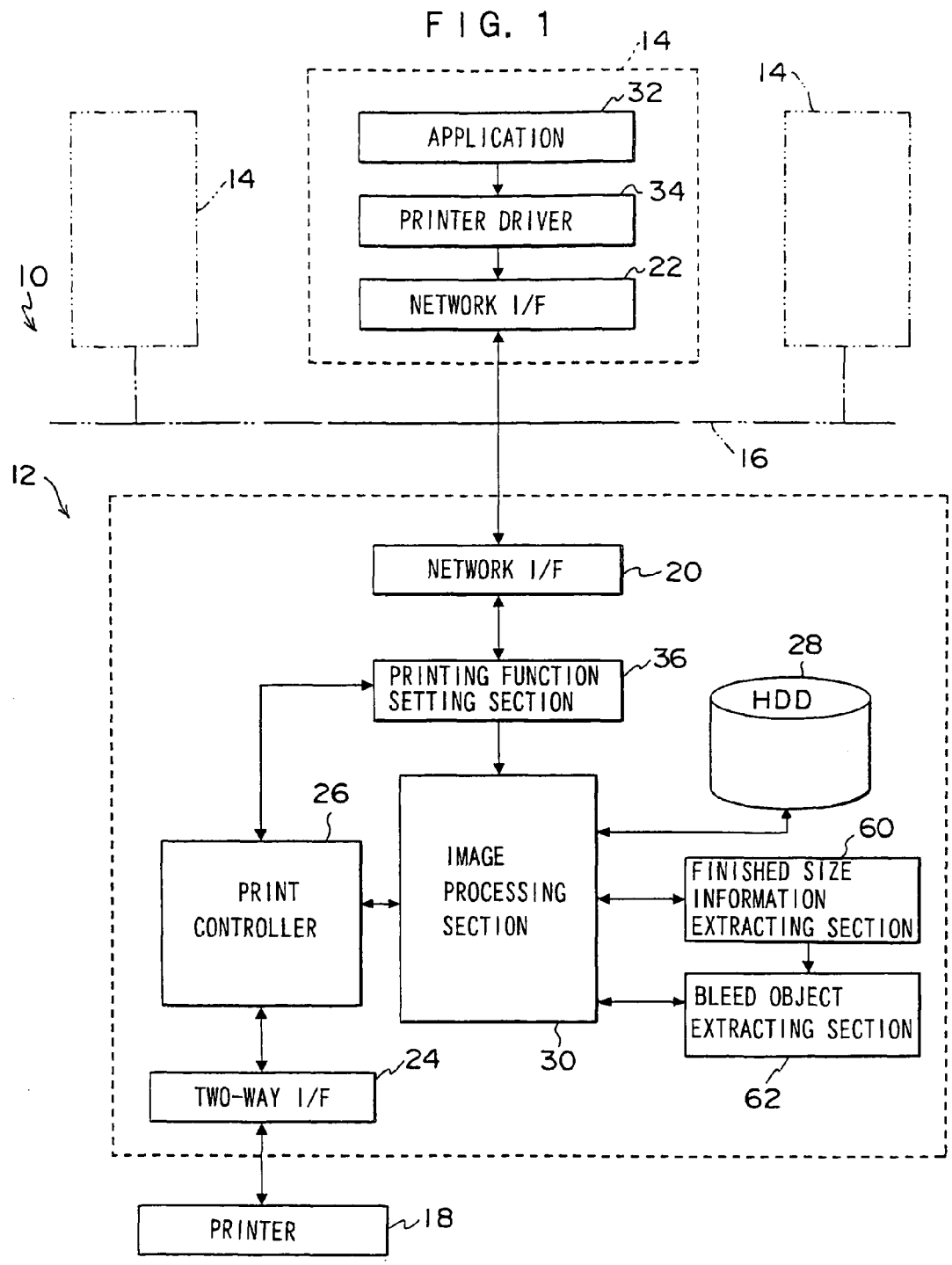
FIG. 1 is a schematic structural diagram of a print server and a network applied to the present embodiment.

Hereinafter, an embodiment of the present invention will be described with reference to the drawings. FIG. 1 shows the schematic structure of a network 10 applied to the present embodiment. In the network 10, a print server 12, which is provided as an image processing device to which the present invention is applied, and plural client terminals 14, which are provided as image processing terminals, are network-connected via a communication line 16.

A printer 18 serving as a print-out device is connected to the print server 12. When the print server 12 receives a print job outputted from the client terminal 14, image processing and printing-out corresponding to that print job are carried out.

Hereinafter, description will be given by using the print server 12 as an example of the image processing device. However, the image processing device of the present invention is not limited to the same, and may be a structure that carries out image processing and that is provided at any type of intermediate server, such as a file server or the like, which is network-connected to the client terminals 14. Further, the processing results of the image processing device of the present invention are not limited to be transmitted to the printer 18. Any of various types of output devices such as a plate setter, which directly exposes a photosensitive planographic printing plate precursor on the basis of image data in order to prepare a printing plate for printing, or an exposure device, which exposes a film (a photographic film for plate-making) used in image printing (exposure) onto a photosensitive planographic printing plate precursor, or the like can be connected to the image processing device for transmission of the processing results.

Network interfaces (network I/Fs) 20 and 22 are provided at the print server 12 and the client terminals 14. The print server 12 and the client terminals 14 are connected to the communication line 16 via the network I/Fs 20 and 22, such that the transmission and receipt of various types of data therebetween is possible.

The print server 12 has a two-way interface (two-way I/F) 24, and is connected to the printer 18 via this two-way I/F 24. Note that plural printers 18 may be connected to the print server 12.

The print server 12 can be structured by adding a PCI board having predetermined functions to a personal computer (PC), or the like. Further, an input device such as a keyboard, a mouse, or the like, and a display device such as a CRT display, an LCD display, or the like, may be connected to the print server 12. The print server 12 may have a WYSIWYG function that processes the image displayed on the display device and prints-out the displayed image. Moreover, the print server 12 may be integrated with the printer 18, or may be a separate body.

A print controller 26 which controls operations of the print server 12 and the printer 18, an HDD 28 which stores various types of data, and an image processing section 30 are provided at the print server 12. The image processing section 30 carries out RIP processing for generating raster data on the basis of job data such as image data or an image-drawing command or the like inputted as a job such as a print job or the like from the client terminal 14 (hereinafter called "print job"). Note that a general known configuration may be applied to the basic configuration of the print server 12, and the detailed description thereof is omitted in the present embodiment.

The client terminal 14 has a DTP application (hereinafter called "application") 32. By using this application 32, the client terminal 14 carries out image processings such as creation, manipulation, editing and the like of images and text, and document creation, and the like so as to prepare print data (image data or an image-drawing command) for printing of a page layout or the like.

A printer driver (driver software) 34 is provided at the client terminal 14. By using the printer driver 34, the client terminal 14 can output print data prepared by the application 32 to the print server 12 as a print job. At this time, settings of the various types of printing functions and the like can be carried out by the printer driver 34.

A printing function setting section 36 is provided at the print server 12. When a print job transmitted from the client terminal 14 is received at the print server 12, the printing function setting section 36 carries out setting of the respective types of printing functions which are designated in the print job, such that a print-out which corresponds to the print job is obtained on the basis of the set printing functions.

With regard to the application 32 provided at the client terminal 14, there is a type which automatically adds registration marks which are used in plate-making, printing, and bookbinding (cutting) processes, and a type in which the addition of registration marks can be designated by using a user interface. There are therefore cases in which a print job which includes such registration marks is transmitted to the print server 12.

Figure 2:
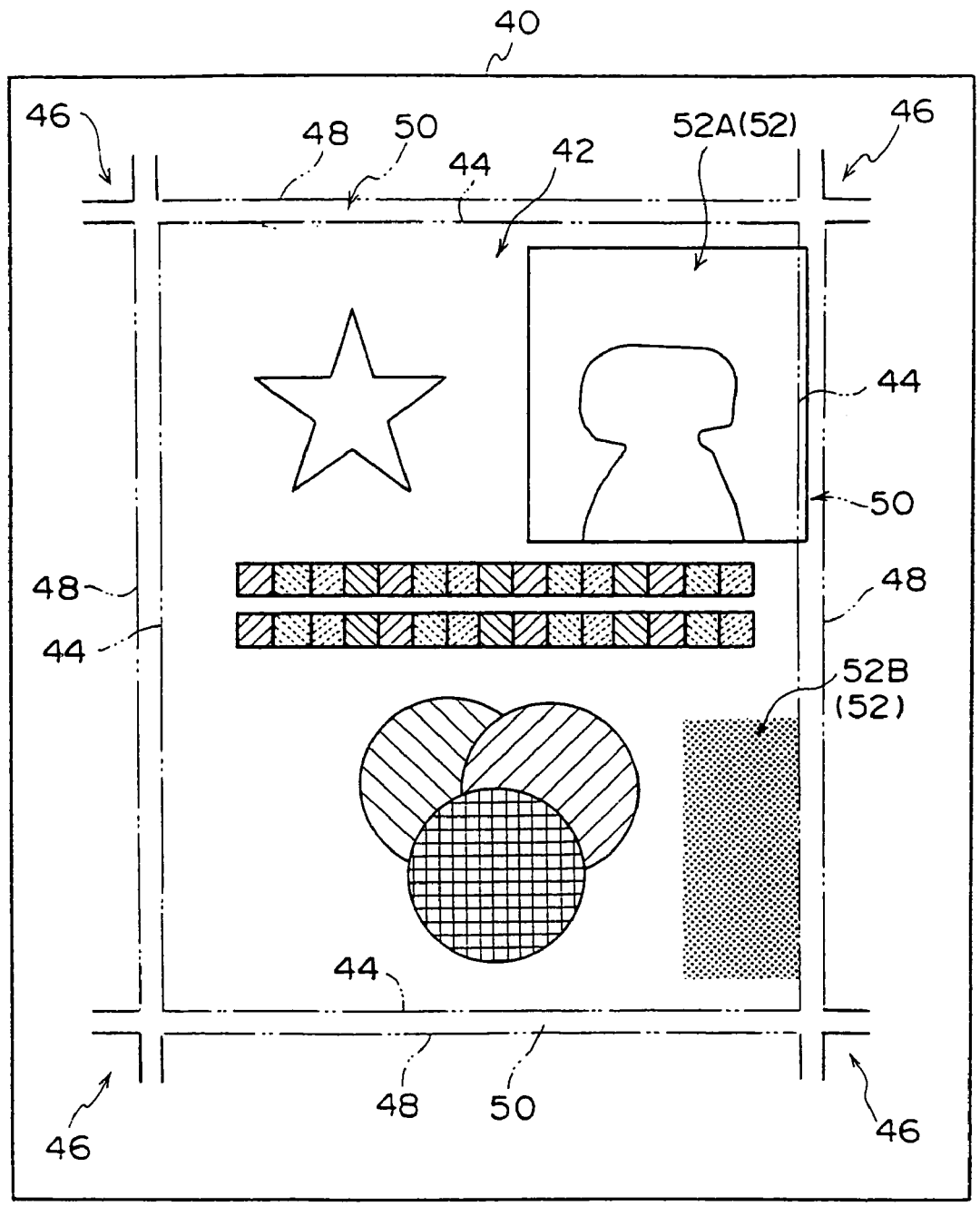
FIG. 2 is a schematic diagram showing an example of a page layout.

FIG. 2 summarily shows a page layout 42 which is prepared by using the application 32 at the client terminal 14, and which is formed on a recording sheet 40. When the page layout 42 is printed-out onto the recording sheet 40, the region within the imaginary lines shown as finish lines 44 (the two-dot chain lines at the inner side in FIG. 2) is the plate surface (the finished surface).

Due to, for example, corner registration marks 46 being added by the application 32 at this time, the positions of the finish lines 44 can be determined by these corner registration marks 46. Note that the registration marks which are added by the application 32 are not limited to the corner registration marks 46. Moreover, the configuration of the corner registration marks 46 is not limited to the configuration shown in FIG. 2, but hereinafter, explanation will be given by using the corner registration marks 46 shown in FIG. 2 as an example.

When the page layout 42 is prepared by using the application 32 (see FIG. 1), objects such as images and the like, and text and the like are placed on the plate surface (within the finish lines 44). Namely, the region on the recording sheet 40 at the inner side of the finish lines 44 is a workable region where work can be carried out at the time of carrying out creation, manipulation, and editing of images and text at the client terminal 14 by using the application 32. The user, who is preparing the page layout at the client terminal 14 by using the application 32, carries out creation, manipulation, and editing of images and text within the finish lines 44.

The corner registration marks 46 can specify the positions of bleed lines 48 which are shown by the imaginary lines (the two-dot chain lines) at the outer side of the finish lines 44 in FIG. 2. Between the finish lines 44 and the bleed lines 48, there is a cutting margin (allowance) 50 of a width of about 3 mm for example. Note that the finish lines 44 and the bleed lines 48 shown by the two-dot chain lines in FIG. 2 usually do not appear on the recording sheet 40.

The application 32 automatically adds the corner registration marks 46, which can specify the positions of the finish lines 44 and the bleed lines 48 on the prepared page layout 42, at the outer side of the finish lines 44, i.e., to the four corners at the outside of the workable region of the user.

When preparing a printing plate for printing which corresponds to the page layout 42, the corner registration marks 46 are printed on a photosensitive planographic printing plate precursor (a printing plate) together with the image corresponding to the page layout 42.

In this way, the page layout 42 is printed on a sheet for printing by using this printing plate. In a bookbinding step for example, the sheet for printing is cut on the basis of the corner registration marks 46 and by using the positions of the finish lines 44, which can be imagined from the corner registration marks 46, as guides.

As shown in FIG. 1, the print server 12 has a finished size information extracting section 60. When, for example, the application 32 adds, to the print job or to the page layout 42 of the print job, information (finished dimension information) which can specify the positions of the finish lines 44, such as the corner registration marks 46 or the like, the finished size information extracting section 60 extracts the positions of the finish lines 44 on the page layout 42 on the basis of this information.

In the present embodiment, when the application 32 adds the corner registration marks 46, the position information of the finish lines 44 is extracted by using the corner registration marks 46. However, when an application which adds a center registration mark is used, the positions of the finish lines 44 may be specified on the basis of the center registration mark and the finished size.

A bleed object extracting section 62 is provided at the print server 12. On the basis of the peripheral edges of the objects on the page layout 42 and the positions of the finish lines 44, the bleed object extracting section 62 extracts objects which must be image-drawn so as to cross-over the finish lines 44.

When there is an object extracted by the bleed object extracting section 62, the image processing section 30 provided at the print server 12 can carry out, on that object, bleeding or enlargement processing (hereinafter called "bleeding processing") so as to make that object cross-over the finish line 44.

Namely, when an object extracted by the bleed object extracting section 62 is a photographed image (object 52A shown in FIG. 2) or the like, the image processing section 30, by enlarging that object 52, disposes the object 52 such that the edge thereof at the finish line 44 side at least crosses-over the finish line 44, and preferably reaches the bleed line 48. Note that, at this time, the object 52 is enlarged and disposed on the page layout 42 such that the finish line 44 side edge thereof reaches the bleed line 48, without moving the position of the edge of the object 52 at the side opposite the finish line 44.

When the object which is extracted by the bleed object extracting section 62 is, for example, an object coloring in the background to a predetermined color (object 52B shown in FIG. 2) or the like, that background is extended (bled) so as to at least cross-over the finish line 44, and preferably so as to reach the bleed line 48.

Figure 3:
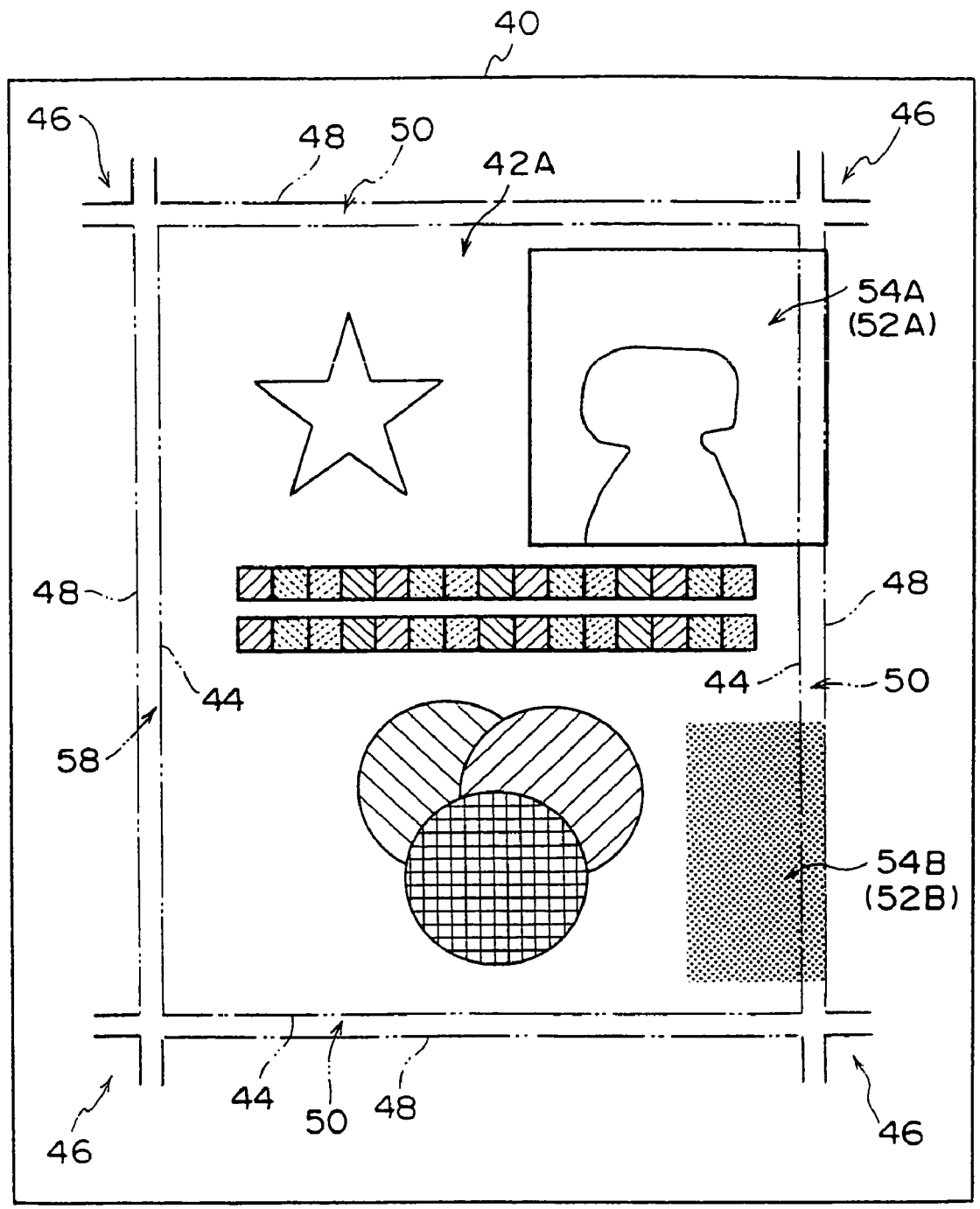
FIG. 3 is a schematic diagram showing an example of a page layout in which bleeding processing has been carried out on objects.

By carrying out bleeding processing at the print server 12 in this way, as shown in FIG. 3, when the page layout 42 is formed on the recording sheet 40, the objects 52A and 52B and the like, which are disposed such that the edges thereof are in vicinities of the finish lines 44 or overlap the finish lines 44, at least cross-over the finish lines 44, and preferably reach the bleed lines 48.

In this way, when the page layout 42 which is printed-out is cut to a set size, it is possible to prevent the formation of gaps (margins) which are white (the color of the recording sheet 40) between the cutting positions and the objects 52A and 52B.

Hereinafter, as operation of the present embodiment, description will be given of printing processing carried out on a print job which includes a page layout at which bleeding is necessary.

At the print server 12, when a print job transmitted from the client terminal 14 is received, first, the designations of the printing functions are read-in, and the printing functions are set on the basis of these designations. Thereafter, RIP processing and image processing based on the settings of the printing functions are carried out, and the data is outputted to the printer 18. In this way, images based on the respective page layouts 42 of the print job are formed on the recording sheets 40.

The page layout 42 or the like is prepared, by using the application 32, at the client terminal 14 provided at the network 10. At this time, at the client terminal 14, there are cases in which the application 32 or the like adds the corner registration marks 46 to predetermined positions of the page layout 42. Further, there are cases in which the user designates the addition of the corner registration marks 46 when he/she prepares the page layout 42 by using the application 32.

Thus, there are cases in which the corner registration marks 46 are added on the page layout 42 which is transmitted from the client terminal 14.

On the other hand, when the user prepares the page layout 42 by using the application 32, there are cases in which the objects are disposed so as to fill the finished size. At such times, when the page layout 42 is printed and is cut to the finished size, a gap may arise between the cut edge and an object which was to have been image-drawn so as to fill-up the finished size, and this gap remains as a blank space on the printed matter.

In order to prevent this from occurring, when the page layout is prepared by using the application 32, so-called bleeding is carried out such that the object is drawn larger, by an amount corresponding to the cutting margin (about 3 mm), than the finished size of the page layout 42, or the like. However, there are cases in which this bleeding is insufficient, and cases in which the user forgets to carry out the bleeding even though it is needed.

Thus, at the print server 12, it is determined, with respect to the print job transmitted from the client terminal 14, whether or not an object requiring bleeding remains on the page layout. When an object which is considered to require bleeding is included, the client terminal 14 is notified of this fact, such that it is possible to prevent the user from forgetting to carry out bleeding.

When there is an object requiring bleeding, the print server 12 can carry out bleeding processing on that object and carry out printing-out.

Figure 4:
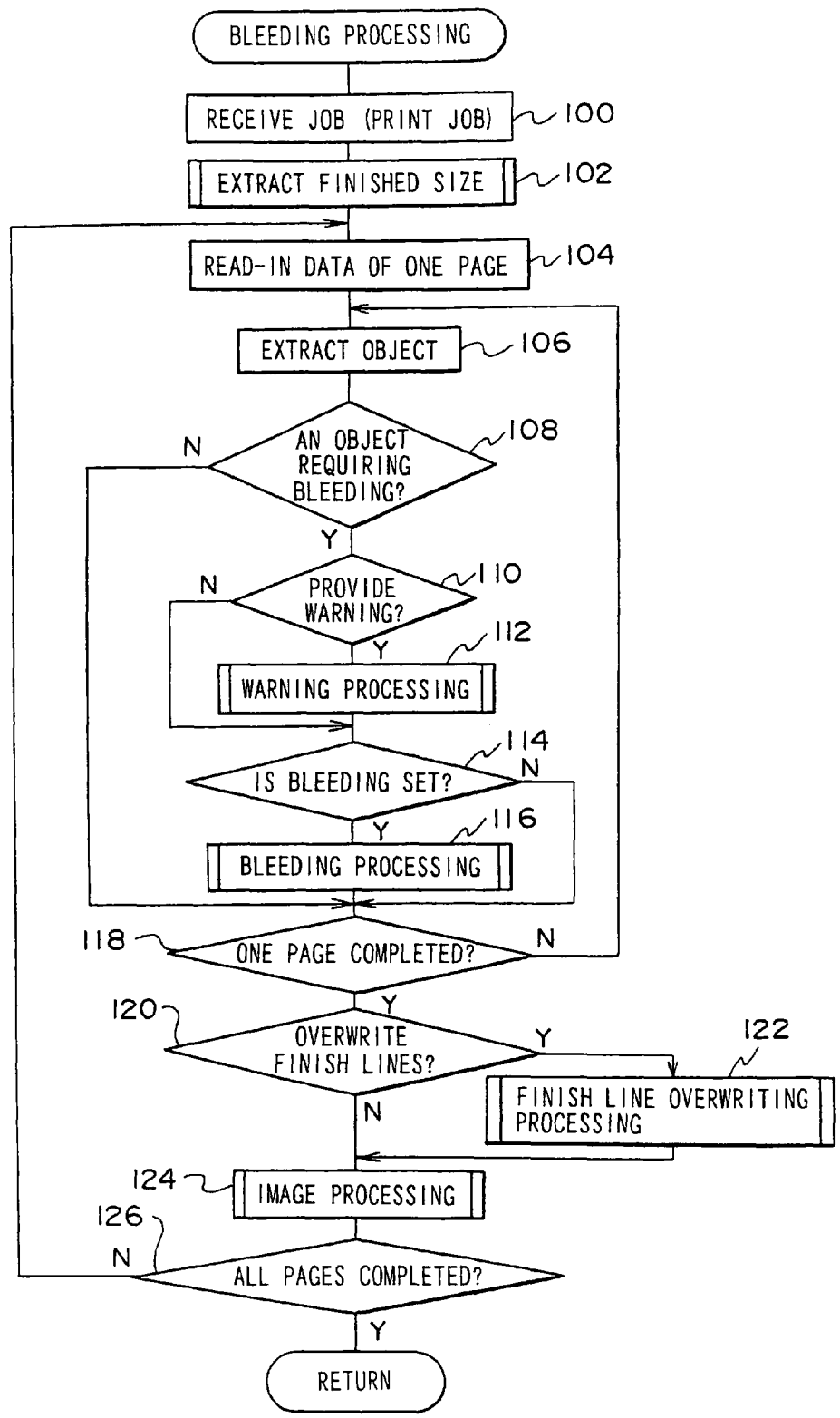
FIG. 4 is a flowchart showing an example of bleeding processing at the print server.

FIG. 4 shows an example of the bleeding processing executed at the print server 12. When print jobs transmitted from the client terminal 14 are received in initial step 100, this flowchart is executed in order for each received print job.

Whether bleeding processing should be carried out or not, can be selected and set at the print server 12 by using an unillustrated user interface. Or, a user interface may be provided at the client terminal 14, the user using the client terminal 14, i.e., the user who prepared the print job, can carry out selection and setting through this user interface.

Further, notification may be given at the print server 12 that bleeding has been forgotten, and setting may be carried out at the print server 12 or at the client terminal 14 as to whether or not this notification of the forgetting of bleeding is to be carried out.

In the bleeding processing, first, in step 102, the finished size is extracted. The pattern of the image-drawing code which draws the registration marks, such as the corner registration marks 46 and the like, is determined in advance. Therefore, in the extraction of the finished size, on the basis of this pattern, first, the image-drawing code which draws the registration marks such as the corner registration marks 46 and the like is specified.

Thereafter, by using the coordinate information of the registration marks, the positions of the finish lines 44 and the finished size can be specified.

Namely, as shown in FIG. 2, because the positions of the finish lines 44 are specified by the corner registration marks 46, the positions of the finish lines 44 can be specified from the positional coordinates of the respective corner registration marks 46.

Among DTP applications, there are those which output, as added information, information regarding the positions of the finish lines 44 and the size. In such cases, this information can be extracted and used. For example, there may be the following descriptions.

[[ThisPage]<</TrimBox[123.363 174.556 718.638 1016.45]>>/PUT pdfmark
[[ThisPage]<</BleedBox[114.859 166.052 727.142 1024.95]>>/PUT pdfmark Here, "TrimBox" expresses the finished size, and "Bleed-Box" expresses the size including the bleed allowances. Therefore, the finished size can be easily obtained.

When the finished size is extracted and the positions of the finish lines 44 are obtained in this way, the flowchart of FIG. 4 moves on to step 104 where data of one page is read-in. In step 106, object extraction is carried out.

Thereafter, in step 108, it is determined, from the positions of the extracted objects and the positions of the finish lines 44, whether there is an object requiring bleeding.

Here, when an extracted object is at a position which is at the inner side of the finish line 44 and near the finish line 44, it is determined that the extracted object is an object for which bleeding is needed. The determination in step 108 is affirmative, and the routine moves on to step 110.

In step 110, in accordance with the settings at the unillustrated user interface or the like, it is determined whether or not warning is to be carried out. When the giving of a warning is set by the user interface or the like, the determination in step 110 is affirmative, and the routine moves on to step 112.

In step 112, warning processing is carried out such that the user can reliably recognize the fact that the extracted object is an object requiring bleeding.

As this warning processing, a message, which states that an object requiring bleeding is included, is transmitted to the client terminal 14 which transmitted that print job. Further, as this warning processing, an image-drawing command may be prepared such that, at the time when printing processing is carried out at the printer 18, the region between the finish line 44 or the bleed line 48 and the object is filled in with a warning color such as red for example, so that the object and the region requiring bleeding can be made clear. Or, the object itself may be drawn by a warning color such as red for example. Note that any one of the aforementioned warning processings may be utilized, or several of them may be used in combination. Further, any arbitrary method can be used provided that that object becomes clear to the user.

On the other hand, the determination as to whether an object is an object needing bleeding can be carried out by using the interval between the edge of the object and the finish line 44.

For example, when the lower left and upper right coordinates of the finished size are (123.363, 174.556), (718.638, 1016.45), if the lower left and upper right coordinates of an extracted object are set at (500, 500), (718, 800) such that the object is to be drawn in a quadrangular form, it is determined that the extracted object is an object requiring bleeding.

Namely, if the interval between the edge of an object and the finish line is about several millimeters (e.g., 5 mm or less), it can be determined that the object is an object requiring bleeding. It suffices for the interval at this time to be set in advance at the print server 12 by using a user interface.

In addition to the interval between the object and the finish line 44, whether or not the edge of the object and the finish line 44 are parallel can be used. For example, if the edge of the object and the finish line 44 are substantially parallel, it is determined that the object is an object needing bleeding.

Further, when the edge of the extracted object overlaps the finish line 44 or crosses-over the finish line 44 (juts out to the outer side of the finish line 44), it is determined that the object is an object for which bleeding is required.

In step 114 of the flowchart of FIG. 4, it is confirmed whether or not setting has been carried out to effect bleeding, in accordance with the setting at the unillustrated user interface or the like, similarly as in above-described step 110. At this time, if a setting that bleeding is to be carried out has been made at the user interface, the determination in step 114 is affirmative, and the routine moves on to step 116.

In step 116, bleeding processing is carried out so that the edge of the extracted object reaches the bleed line 48.

Namely, when the extracted object is the object 52B shown in FIG. 2, bleeding is carried out so that the background reaches the bleed line 48. In this way, object 54B which has been subjected to bleeding is obtained as shown in FIG. 3.

Further, when the extracted object is the object 52A shown in FIG. 2, the edge of the object 52A is made to reach the bleed line 48 by enlarging the object 52A or the like. At this time, it is preferable that the processing be carried out without changing the position of the edge of the object 52A which edge is far from the finish line 44.

In this way, as shown in FIG. 3, an object 54A which has been subjected to bleeding processing is obtained.

In this way, in the flowchart of FIG. 4, while extracting the objects, it is determined, for each object, whether or not warning is needed and whether or not bleeding is needed. When the warning processing and bleeding processing are carried out as needed, it is confirmed in step 118 whether or not processing has been completed for all of the objects within the page. If processing is completed for all of the objects, the determination in step 118 is affirmative, and the routine proceeds to step 120.

In step 120, it is confirmed whether or not the finish lines 44 are to be overwritten on the page layout. Whether or not the finish lines 44 are to be overwritten may be set in advance at the print server 12 by using a user interface, or the user may carry out the setting at the client terminal 14.

Here, if the finish lines 44 are to be overwritten, the determination in step 120 is affirmative. The routine moves on to step 122, where a command for drawing the finish lines 44 is prepared.

Thereafter, the routine moves on to step 124 where image processing for that page is carried out. In step 126, it is confirmed whether or not processing has been completed for all of the pages. If there are remaining pages, the determination in step 126 is negative, and the routine proceeds to step 104 where processing for the next page is carried out.

By carrying out processing on the print job in this way, on the basis of the page layout 42 shown in FIG. 2 for example, bleeding processing is carried out reliably on the objects 52A and 52B, and a page layout 42A shown in FIG. 3 is obtained.

At this time, the user can reliably be informed of the existence of objects for which bleeding has substantially not been carried out, regardless of whether it is considered that there is a need for the bleeding. Therefore, it is possible to reliably prevent the inability to obtain a desired finish due the forgetting of bleeding.

Because reliable bleeding can be carried out and the finish lines 44 are clear, the finish of the page layout can be grasped accurately.

In the above-described embodiment, the print server 12 provided at the network 10 is described as an example. However, the present invention is not limited to the print server 12, and can be applied to an image processing device of an arbitrary structure.

Further, it suffices for the determining section of the present invention to carry out determination on the basis of the interval between the finish line and the edge of the object at the finish line side.

Moreover, it suffices for the object extracting section of the present invention to carry out extraction on the basis of the interval between the finish line and the edge of the object at the finish line side.

What is claimed is:

1. An image processing device carrying out image processing on any one of image data and an image-drawing command inputted from an image processing terminal, the image processing device comprising:
    an extracting section that extracts finished dimension information according to the one of the image data and the image-drawing command;
    an image-drawing section that draws a finish line on a page layout which corresponds to the one of the image data and the image-drawing command, on the basis of the finished dimension information extracted by the extracting section; and
    a bleeding drawing section that carries out bleeding processing such that an edge of an object extracted by an object extracting section reaches a predetermined position crossing-over the finish line but not extending over a bleed line.

2. The image processing device of claim 1, wherein the finished dimension information includes coordinate information of registration marks, and
    the image-drawing section draws the finish line using the coordinate information.

3. The image processing device of claim 2, wherein the registration marks include coordinate information of corner registration marks.

4. The image processing device of claim 1, wherein the bleeding drawing section draws the edge of the object extracted by the object extraction section to dispose the edge of the object at the predetermined position crossing-over the finish line but not extending over the bleed line.

5. The image processing device of claim 1, wherein the object extraction section extracts, from the finished dimension information extracted by the extracting section, an object for which bleeding processing is to be carried out.

6. The image processing device of claim 1, whereby the finish line and the bleed line define therebetween a cutting margin.

7. The image processing device of claim 1, further comprising:
    a warning section that draws between the object and the finish line or the bleed line with a warning color, or draws the object with the warning color.

8. An image processing device carrying out image processing on any one of image data and an image-drawing command inputted from an image processing terminal, the image processing device comprising:
    an extracting section that extracts finished dimension information according to the one of the image data and the image-drawing command;
    a determining section that determines, from the finished dimension information extracted by the extracting section and positional information of an object on a page layout which is based on the one of the image data and the image-drawing command, an object requiring bleeding which fills-in by bleeding a region between the object and a finish line obtained from the finished dimension information so as not to extend beyond a bleed line obtained from the finished dimension information; and
    a notifying section that provides notice of results of determination of the determining section;
    wherein the finished dimension information includes coordinate information of registration marks.

9. The image processing device of claim 8, wherein the determining section carries out determination on the basis of an interval between the finish line and a finish line side edge of the object.

10. The image processing device of claim 9, wherein the determining section determines that the object is an object requiring bleeding, when the interval between the finish line and the finish line side edge of the object is less than or equal to a predetermined value.

11. The image processing device of claim 9, wherein the determining section determines that the object is an object requiring bleeding, when the finish line and the finish line side edge of the object are substantially parallel.

12. The image processing device of claim 9, wherein the determining section determines that the object is an object requiring bleeding, when the finish line side edge of the object overlaps the finish line or crosses-over to an outer side of the finish line.

13. The image processing device of claim 8, wherein the notifying section transmits, to the image processing terminal, a message relating to the results of determination.

14. The image processing device of claim 8, wherein the notifying section generates an image-drawing command displaying, in a specific color, at least a portion of the object requiring bleeding.

15. The image processing device of claim 8, wherein the coordinate information of the registration marks includes coordinate information of corner registration marks.

16. The image processing device of claim 8, wherein a position of the bleed line at an outer side of the finish line can be specified by the registration marks, and bleeding processing is carried out so that a finish line side edge of the object reaches the bleed line.

17. The image processing device of claim 8, further comprising:
    a warning section that draws between the object and the finish line or the bleed line with a warning color, or draws the object with the warning color.

18. An image processing device carrying out image processing on any one of image data and an image-drawing command inputted from an image processing terminal, the image processing device comprising:
    an extracting section that extracts finished dimension information according to the one of the image data and the image-drawing command;
    an object extracting section that extracts, from the finished dimension information extracted by the extracting section and positional information of an object on a page layout which is based on the one of the image data and the image-drawing command, an object for which bleeding processing is to be carried out, the bleeding processing filling-in a region between the object and a finish line obtained from the finished dimension information; and
    a bleeding drawing section that carries out bleeding processing such that an edge of the object extracted by the object extracting section reaches a predetermined position crossing-over the finish line;

wherein the finished dimension information includes coordinate information of registration marks; and wherein a position of a bleed line at an outer side of the finish line is specified by the registration marks, and bleeding is carried out so that a finish line side edge of the object reaches but does not extend over the bleed line.

19. The image processing device of claim 18, wherein the object extracting section carries out extraction on the basis of an interval between the finish line and the finish line side edge of the object.

20. The image processing device of claim 19, wherein the object extracting section carries out extraction by determining that the object is an object for which bleeding processing is to be carried out, when the interval between the finish line and the finish line side edge of the object is less than or equal to a predetermined value.

21. The image processing device of claim 18, wherein the object extracting section carries out extraction by determining that the object is an object for which bleeding processing is to be carried out, when the finish line and the finish line side edge of the object are substantially parallel.

22. The image processing device of claim 18, wherein the object extracting section carries out extraction by determining that the object is an object for which bleeding processing is to be carried out, when the finish line side edge of the object overlaps the finish line or crosses-over to an outer side of the finish line.

23. The image processing device of claim 18, wherein, when the extracted object is an object which colors-in a background by a predetermined color, in the bleeding processing, extension of coloring-in by the predetermined color is carried out so as to cross-over the finish line.

24. The image processing device of claim 18, wherein, in the bleeding processing, the extracted object is disposed such that the finish line side edge among edges of the object crosses-over the finish line, by enlarging the extracted object.

25. The image processing device of claim 24, wherein the object is enlarged without changing positions of edges of the extracted object other than the finish line side edge.

26. The image processing device of claim 18, wherein the coordinate information of the registration marks includes coordinate information of corner registration marks.

27. The image processing device of claim 18, further comprising:

a warning section that draws between the object and the finish line or the bleed line with a warning color, or draws the object with the warning color.

* * * * *